W. D. MARKS.
Governor.

No. 164,745. Patented June 22, 1875.

WITNESSES:
C. Neveux
A. F. Terry

INVENTOR:
W. D. Marks
BY
ATTORNEYS.

UNITED STATES PATENT OFFICE.

WILLIAM D. MARKS, OF CHATTANOOGA, TENNESSEE.

IMPROVEMENT IN GOVERNORS.

Specification forming part of Letters Patent No. 164,745, dated June 22, 1875; application filed May 22, 1875.

*To all whom it may concern:*

Be it known that I, WILLIAM D. MARKS, of Chattanooga, in the county of Hamilton and State of Tennessee, have invented a new and Improved Governor for Steam-Engines, of which the following is a specification:

In this improved governor, which I call isochronous, the pendulum-spindle is in two sections, of which the lower one, to which the driving-power is geared, is capable of sliding lengthwise a little, at the same time that it turns the upper one, and it screws up and down in the hub of its driving-wheel, and is connected to the wheel by a spring, which allows the wheel to overrun the spindle a little, and screw the spindle along when the motion increases to close the valve in advance of any change in the position of the pendulum, and when the motion of the engine slacks the tension of the spring will make the spindle overrun the wheel, which will screw the spindle along the other way, and open the valve in advance of the changing of the pendulum, thus making a much more sensitive governor than others now in use.

Figure 1:
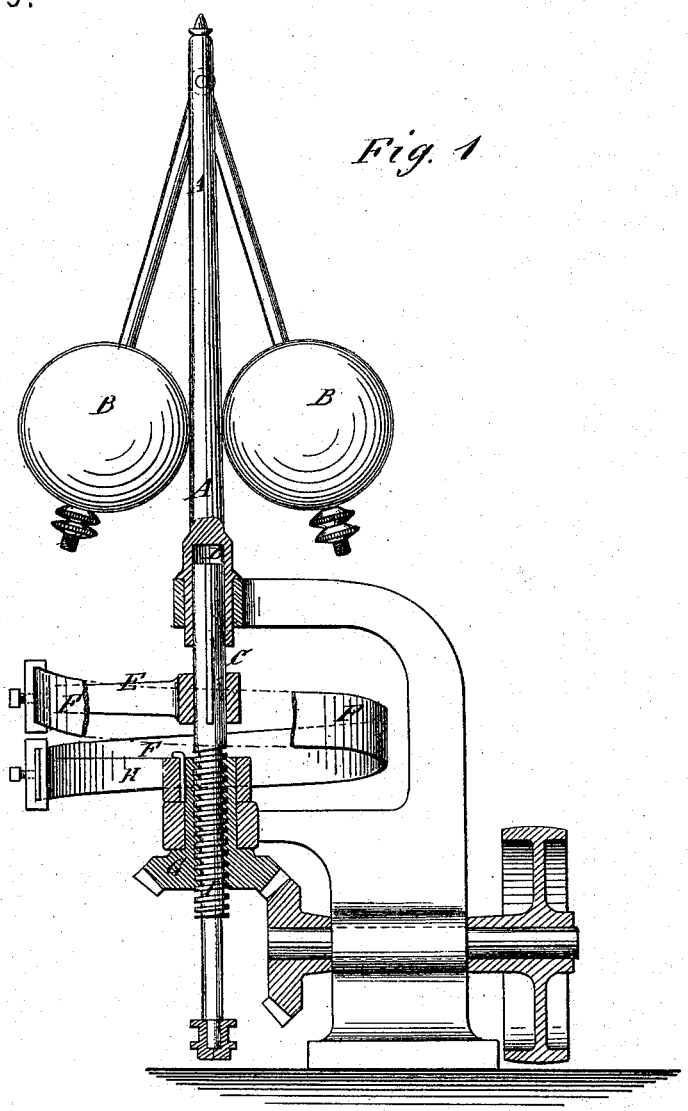
Figure 2:
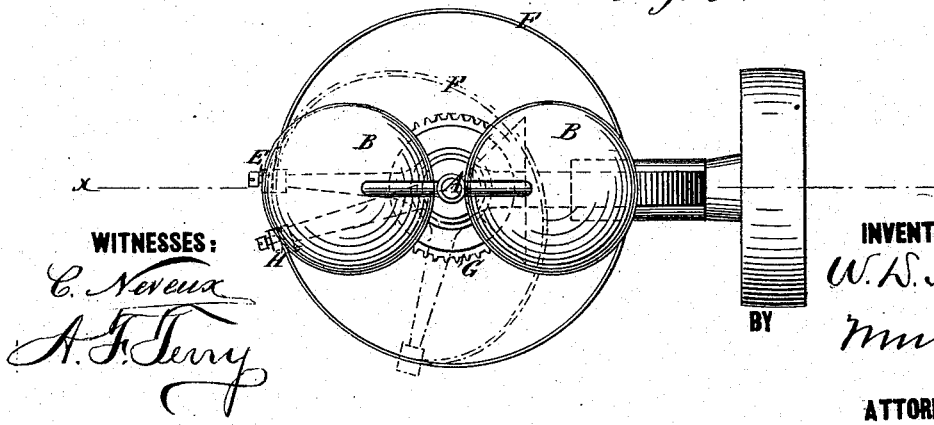

Figure 1 is a sectional elevation of my improved governor taken on the line $x\,x$ of Fig. 2. Fig. 2 is a top view.

Similar letters of reference indicate corresponding parts.

A is the upper section of the spindle, carrying the pendulum B. C is the lower section, to which the power is connected. It enters a socket, D, in the upper section, and is capable of sliding lengthwise therein a little. It also carries an arm, E, to the outer end of which is attached the upper end of the coiled spring F, whose other end is connected to the hub of the driving-wheel G, by the arm H, to allow the driving-wheel to advance faster than the spindle for a short time, when the speed suddenly increases, and fall behind it when the motion slows, in order to screw the spindle up or down by its threaded portion I in the screw-threaded hub, and thus shift the valve.

The resistance or inertia of the pendulum will contract the spring more or less, according to the speed, and when the connection of the spindle with the valve is set for any given speed, any increase of speed will contract the spring still more by which the spindle will be screwed along so as to close the valve, and on the other hand the spring will expand when the motion slows, and shift the spindle the other way for opening the valve.

Having thus described my invention, I claim as new and desire to secure by Letters Patent—

1. The combination of the conical pendulum B with the spring E and screw-spindle C, substantially as described.

2. The combination of the screw-spindle C passing through the wheel G and the spring E, so attached to the spindle C and the wheel G as to raise and lower the valve by the yielding of the spring E, substantially as described.

3. The combination of the screw-spindle C in wheel G, spring E, and conical pendulum B with a valve, so as to regulate the speed of an engine or other prime mover, by using the inertia of the conical pendulum B to close the valve, and its extra-acquired momentum to open the valve when a change of speed is attempted, the valve movement preceding the action of the pendulum, substantially as and for the purpose described.

WM. D. MARKS.

Witnesses:
J. N. TRIGG,
J. M. JACKSON.